United States Patent [19]

Levy et al.

[11] Patent Number: 5,604,403
[45] Date of Patent: Feb. 18, 1997

[54] COLOR MONITOR MAGNETIC SHIELD

[75] Inventors: Moises Levy, Melrose Park; Ralph Wasserman, Willow Grove, both of Pa.

[73] Assignee: Aydin Corporation, Horsham, Pa.

[21] Appl. No.: 469,384

[22] Filed: Jun. 6, 1995

[51] Int. Cl.$^6$ ..................................................... H01J 29/06
[52] U.S. Cl. ................................................. 315/8; 315/85
[58] Field of Search ................................. 315/85, 8, 370; 313/479, 407, 408

[56] References Cited

U.S. PATENT DOCUMENTS

| | | |
|---|---|---|
| 2,925,524 | 2/1960 | Heil . |
| 2,962,622 | 11/1960 | Popovich . |
| 3,340,443 | 9/1967 | Rieth et al. . |
| 3,404,307 | 10/1968 | Hayden . |
| 3,757,154 | 9/1973 | Okita et al. . |
| 4,380,716 | 4/1983 | Romeo et al. . |
| 4,458,178 | 7/1984 | Tenney et al. . |
| 4,899,082 | 2/1990 | Sands et al. . |
| 4,963,789 | 10/1990 | Buhler . |
| 5,021,712 | 6/1991 | Sands et al. . |
| 5,038,078 | 8/1991 | Duggan ........................ 315/8 |
| 5,367,221 | 11/1994 | Santy et al. ................... 315/8 |

FOREIGN PATENT DOCUMENTS

| | | |
|---|---|---|
| 2809725 | 9/1979 | Germany . |
| 50-123042 | 4/1977 | Japan . |

OTHER PUBLICATIONS

Interstate Electronics Corporation Demon™—Degauss Environment Magnetic Offset Neutralizer Date: Copyrights Sep. 1993 Pages: 2.
Kits van Heyningen The Evolution of the Modern Electronic Compass Oct. 14, 1986 p. 12.
Analog Devices 8–Bit Analog I/O System Aug. 1988 p. 20.

Primary Examiner—Robert Pascal
Assistant Examiner—David H. Vu
Attorney, Agent, or Firm—Caesar, Rivise, Bernstein, Cohen & Pokotilow, Ltd.

[57] ABSTRACT

A compact color monitor device that utilizes active and passive magnetic shielding to eliminate the visible distortion of color displays due to externally-imposed magnetic fields. The color monitor device can be installed in standard 19-inch EIA rack enclosures used on-board surface vessels and remain operable with no color distortion when the vessel is subjected to ±5 Oersted degaussing fields. The color monitor device includes a quick-degaussing circuit for degaussing internal components in approximately 1/60 of a second.

33 Claims, 7 Drawing Sheets

COLOR MONITOR MAGNETIC SHIELD

FIELD OF THE INVENTION

The invention relates generally to magnetic shielding and more specifically to magnetic shielding of color monitor displays for eliminating the display distortion due to externally imposed magnetic fields.

All navies, including the U.S. Navy, need to operate color cathode ray tube (CRT) video monitors on board surface ships that fit into standard EIA (Electronics Industries Association) 19" rack enclosures. These same steel Navy ships must be continuously degaussed with varying external DC magnetic fields which allows them to operate and not be detected by mine fields and other magnetic sensing devices. In other words, ship degaussing prevents the ship from having a magnetic signature that will attract mines, i.e., make a steel ship act like a "wooden" ship.

However, imposing such external magnetic fields over the entire ship particularly affects color monitor displays located on board ship by magnetically deflecting the CRT color gun beams (e.g., red, green and blue) from their normal trajectories. This deflection results in the colors on the display being mixed, diluted and even reversed; in addition, any images in the display are distorted and even the background colors are distorted into geometrical shapes. For example, "red" indicia on the color display may indicate enemy targets and "blue" indicia may indicate friendly targets. Shifting of the color gun beams from red to blue and vice versa during ship degaussing can dangerously distort the screen content. On the other hand, monochrome CRTs located on board ship are not as greatly affected by the external magnetic field which tends to simply shift the monitor picture, i.e., since everything is in one color, there are no mixing, dilution or reversal of colors that could affect or destroy the content of the screen.

Since the introduction of color monitor displays on board Navy surface ships is a relatively recent occurrence, (e.g., within the last 5-8 years), the conventional solution to this problem is to simply move the color monitor displays out of the magnetically-affected area. However, the problem with that "solution" is that color monitors are necessary in the command/control/communications area and cannot be removed from that location if they are to be of any use on board the ship. Alternative means of shielding utilize passive systems (e.g., enclosure shields disposed around the monitor CRT that block components of the external magnetic field along the top, bottom and sides of the CRT) in combination with active systems, e.g., neutralizing or "compensating" systems. These latter systems actively null the external magnetic field within the monitor's CRT itself to "buck" out the magnetic field perpendicular to the CRT's glass screen ("Z" axis) which cannot, by design, have a shield covering the face. However, at this time, there is no color monitor shield system that provides the requisite shielding against ship degaussing in a compact form that permits the color monitor to be secured within the standard 19-inch U.S. Navy EIA rack enclosure which houses all of the ship's displays and controls.

The following U.S. Patents disclose examples of passive and active magnetic shields used in shielding cathode ray tubes: U.S. Pat. No. 2,925,524 (Heil), U.S. Pat. No. 2,962,622 (Popovich), U.S. Pat. No. 3,340,443 (Rieth et al.), U.S. Pat. No. 3,404,307 (Hayden), U.S. Pat. No. 3,757,154 (Okita et al.), U.S. Pat. No. 4,380,716 (Romeo et al.), U.S. Pat. No. 4,458,178 (Tenney et al.) and U.S. Pat. No. 4,963,789 (Buhler).

The Heil patent discloses methods and apparatus for eliminating distortion of the color purity of color television tubes due to the earth's magnetic field. In particular, the methods and apparatus employ the use of two horizontally-disposed electrical coils, vertically aligned over the top and bottom of the television picture tube. These coils generate magnetic fields to counter the vertical component of the earth's magnetic field.

The Popovich patent discloses a television degaussing apparatus for de-magnetizing internal color television components. The apparatus comprises electrical circuitry that permits the field neutralizing coils, ordinarily used for purity control, to be diverted in use for demagnetizing of various ferromagnetic components (i.e., degaussing) within the television and then to be re-connected for the neutralizing function.

The Rieth et al. patent discloses a series of apparatus for degaussing the shadow mask of a color television. In particular, the various embodiments utilize a degaussing coil that is disposed either around the CRT or is disposed adjacent the CRT and is manually or automatically operated.

The Hayden patent also discloses an apparatus for degaussing the shadow mask, as well as other components in the forward end, of the CRT of a color television. In particular two pairs of series wound coils (one pair disposed on the top of the forward end of the CRT and the second pair disposed on the bottom of the forward end of the CRT) are operable to provide the requisite degaussing. A second embodiment utilizes existing television coils (e.g., television main power transformer) to act as the degaussing coil.

The Okita et al. patent discloses an apparatus for automatically eliminating the influence of the earth's magnetic field on color television receivers. In particular, the apparatus comprises compensation coils positioned around the front of the CRT that are driven in response to respective detectors of the earth's magnetic field. These coils generate compensating magnetic fields that counter the earth's magnetic field which distorts the color television display.

The Romeo et al. patent discloses an apparatus that uses a Helmholtz coil disposed around the CRT to generate a magnetic field to counter an external axial magnetic field that tends to distort the color display of the CRT. The apparatus is an automatically adjusting system that uses a reference display to determine whether a countering magnetic field is necessary. A reference color (e.g., "red") is filtered out of a portion of the CRT gun beam and directed to predetermined locations around the monitor display, not visible to the operator. These locations (e.g., one in each corner of the display) are totally overlapped by the CRT red gun beam whenever there is no external magnetic field distorting the display. As soon as an external magnetic field is present and is strong enough to begin distorting the CRT gun beam, the beam and the reference location become misaligned, thereby triggering the counter magnetic field circuit which operates to generate a counter magnetic field strong enough to restore the overlap.

The Tenney et al. patent discloses a software-controlled apparatus for degaussing a CRT automatically upon power-up or during periods of CRT inactivity.

The Buhler patent discloses a method and apparatus whereby the magnetic field within the specified volume (i.e., CRT) is nulled, i.e., "zeroed", while being subjected to an external magnetic field of up to approximately 5 Oersteds. The device uses a passive magnetic shield and an active magnetic shield. The passive magnetic shield comprises a µ-metal shield to passively prevent the external magnetic field from penetrating into the CRT from the top, bottom and side panels. The active magnetic shield comprises two pairs of coils and one single coil. Each of the pairs and the single coil are oriented to neutralize a respective one of the "X", "Y" and "Z" components of the external magnetic field within the specified volume. In particular, a pair of vertical coils is used to neutralize the "X"-component, a pair of horizontal coils is used to neutralize the "Y"-component, and a single axial coil is used to neutralize the "Z"-component. The configuration of this method/apparatus requires the use of elaborate coils and a plurality of magnetic sensors that are distributed around the CRT. The result is an apparatus that is quite large in size and cannot fit into standard 19-inch U.S. Navy EIA rack enclosures. One embodiment of the '789 patent is the DEMON™-Degauss Environment Magnetic Offset Neutralizer manufactured by Interstate Electronics Corporation which is used for the BSY-II Combat System Display Consoles.

Two foreign publications relating to CRTs and compensating for external magnetic fields are the following:

German Offenlengungsschrift 28 09 725 discloses a CRT device for reducing the effects of stray magnetic fields along the axis of the CRT by using a measuring coil and a compensating coil wound around the axis of the CRT. A shielding enclosure is also used in combination with the coils. The compensating coil is wound around the outside of the CRT screen; the measuring coil can be mounted at some other place around the axis of the CRT, preferably adjacent the compensating coil. The stray magnetic field generates a current in the measuring coil that is used to create a compensating current in the compensating coil of corresponding amplitude and phase of the measuring coil current.

Japanese JP 52-47321 discloses a circuit for detecting earth magnetism to prevent "mislanding" in a color TV receiver. In particular, the circuit utilizes four correction coils that are disposed around the back of the CRT. The coils utilize inputs from magnetic sensors that are distributed around the neck of the CRT. The circuit permits the earth magnetism to be detected accurately and to have a compensating magnetic field generated without interfering with the detection of the earth magnetism.

Therefore, the prior art does not disclose a color monitor with associated shielding systems that can remain undistorted both in color and in geometry while being subjected to an external magnetic field of approximately ±5 Oersteds or more, yet be simple in construction and compact enough to be mounted or disposed within a 19-inch U.S. Navy EIA rack enclosure.

OBJECTS OF THE INVENTION

Accordingly, it is the general object of this invention to provide an apparatus which improves upon and overcomes the disadvantages of the prior art.

It is another object of this invention to provide a color monitor device that eliminates color and geometrical distortion of the display during ship degaussing.

It is still another object of this invention to provide a color monitor device that eliminates color and geometrical distortion subjected to ship degaussing fields as high as ±5 Oersteds.

It is still yet another object of this invention to provide a color monitor device that can be secured within the 19-inch U.S. EIA rack enclosures.

It is even a further object of this invention to provide a color monitor device that can be quickly degaussed in approximately 1/60 of a second or less.

It is still yet a further object of this invention to provide a color monitor device that allows the operator to control the quick-degaussing sensitivity.

It is still yet another object of this invention to provide a color monitor device having a passive magnetic shield that minimizes the effects of ship degaussing, while minimizing the structural projection of the shield away from the cathode ray tube.

It is still yet another object of this invention to provide a color monitor device that utilizes a convergence coil at the back of the device to ensure that proper color convergence is maintained at the color guns.

SUMMARY OF THE INVENTION

These and other objects of the instant invention are achieved by providing an apparatus for reducing the visible distortion of a color cathode ray tube (CRT) of a color monitor caused by an external magnetic field. The CRT has a central longitudinal axis, a rear portion and a front viewing surface. The front viewing surface has a portion disposed generally perpendicular to the central longitudinal axis and also has peripheral edges.

The apparatus comprises a bucking coil disposed adjacent the front viewing surface of the CRT and extending along at least a portion of the peripheral edges thereof for generating a first opposing magnetic field aligned with the central longitudinal axis. The apparatus additionally includes a convergence coil disposed adjacent the rear portion of the CRT for generating a second opposing magnetic field aligned with the central longitudinal axis and wherein the convergence coil is coupled to the bucking coil.

Sensor means are located adjacent the rear portion of the CRT and remote from the bucking coil and the convergence coil for sensing the external magnetic field aligned with the central longitudinal axis and for generating an output signal indicative thereof. The apparatus further comprises control means for providing electrical current to the bucking coil and the convergence coil based on the output signal.

The apparatus additionally comprises passive magnetic shield means covering a portion of the CRT while leaving a major portion of the front surface thereof exposed for unobstructed viewing by an operator of the monitor.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
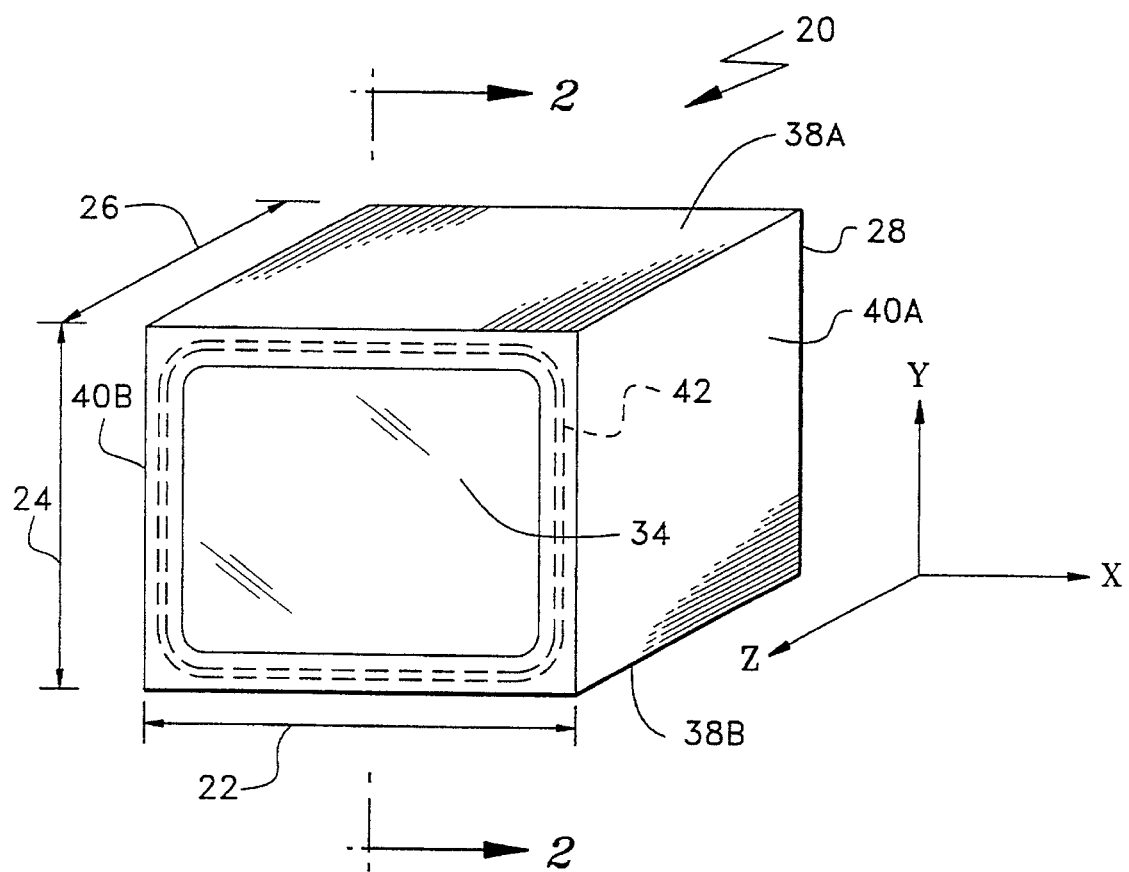
FIG. 1 is an isometric view of the present invention.
Figure 1:
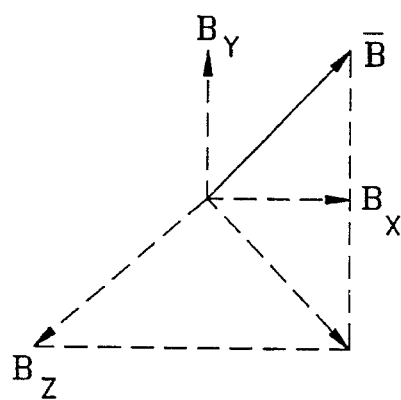

Referring now in detail to the various figures of the drawing wherein like reference characters refer to like parts, there is shown at 20 in FIG. 1, a color monitor magnetic shield (CMMS) which is a specially-designed color monitor that eliminates the visible color and geometric distortion of the monitor display caused by an external magnetic field ($\overline{B}$), e.g., ship-degaussing magnetic field, located in any direction. It should be noted at the outset, by way of example and not limitation, it is assumed that the CMMS 20 defines a Cartesian coordinate space as depicted in FIG. 1 whereby the direction of the width 22 of the CMMS 20 is along the X-axis, the direction of the height 24 of the CMMS 20 is along the Y-axis and the direction of the depth 26 of the CMMS 20 is along the Z-axis. With these definitions, the external magnetic field $\overline{B}$ has corresponding magnetic field components aligned in the respective axes, i.e., an "X"-component ($\overline{B}_X$), a "Y"-component ($\overline{B}_Y$) and a "Z"-component ($\overline{B}_Z$), with each component providing some portion of the distortion in the cathode ray tube (CRT) screen display of the CMMS 20.

The CMMS 20 of this invention eliminates the effects of all of these components using passive and active magnetic shielding, as will be discussed later.

During ship degaussing, the external magnetic field $\overline{B}$ (a typical maximum of ±5 Oersteds at the CMMS 20 location) created thereby magnetically deflects the CRT color gun beams (red, green and blue, not shown) from their normal trajectories. In addition, this external magnetic field $\overline{B}$, along with any counter magnetic field generated to oppose this external magnetic field $\overline{B}$, magnetizes internal CRT ferromagnetic components that also contributes to the trajectory alteration. In a neutral state (i.e., no external magnetic field $\overline{B}$ nor any magnetizing concerns), the trajectories are nearly straight lines originating from the CRT guns at the back of the CRT to the CRT screen 34. This deflection results in the colors on the display being mixed, diluted and even reversed; in addition, any images in the display are distorted and even the background colors are distorted into geometrical shapes.

Figure 2:
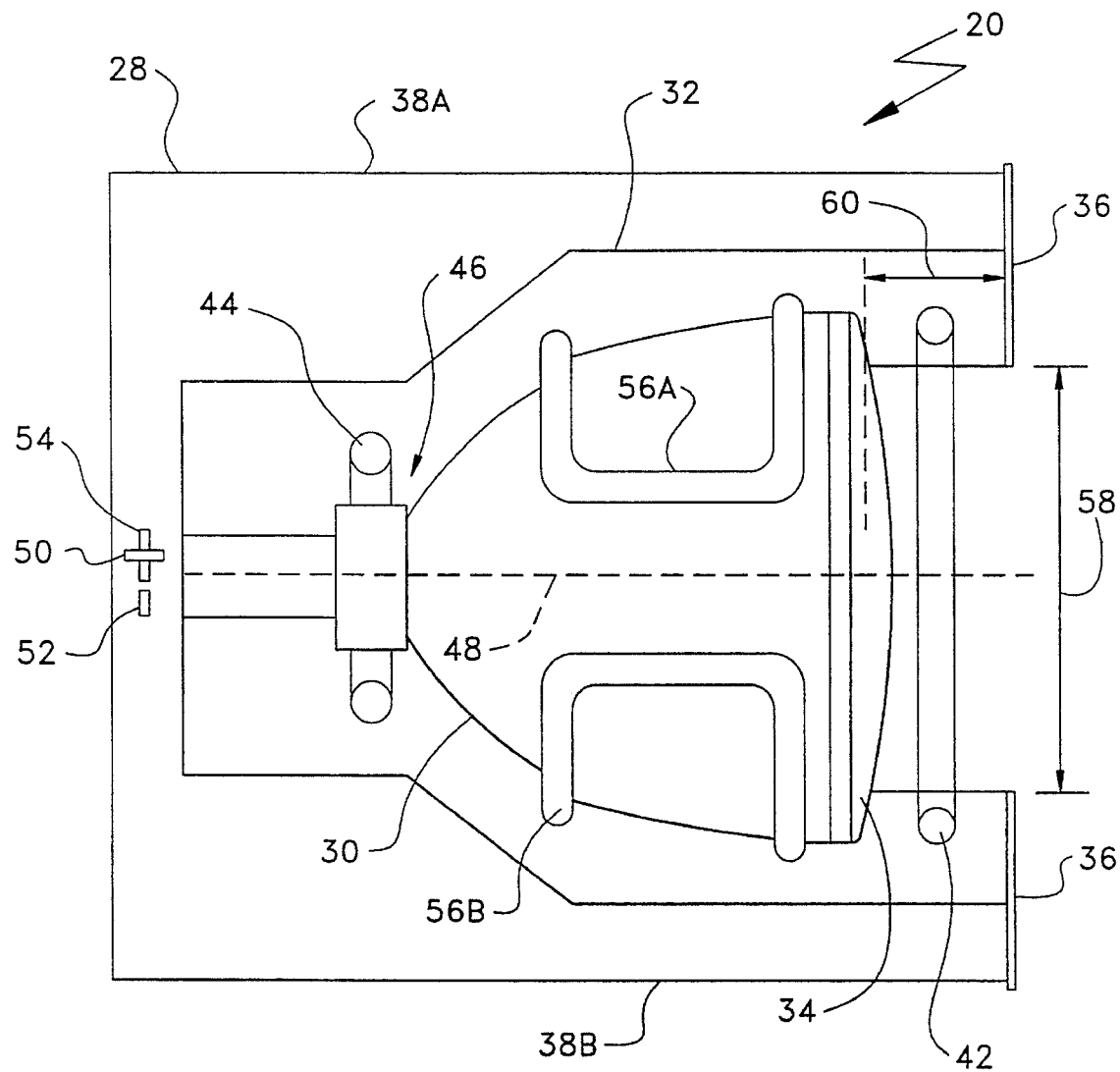
FIG. 2 is an enlarged sectional view taken along line 2—2 of FIG. 1.

As shown in FIG. 2, the CMMS 20 comprises a casing 28 that houses a CRT 30. Within the casing 28 and surrounding the CRT 30 is a μ-metal enclosure 32. The enclosure 32 is open at the front to permit the CRT screen 34 to be visible to the CRT operator and is also open at the back. An aperture shield 36 forms a frame or cap around the periphery of the CRT screen 34 and is coupled to both the casing 28 and the μ-metal enclosure 32. The μ-metal enclosure 32 and the aperture shield 36 together form a passive magnetic shield that shields the CRT 30 from the effects of the external magnetic field ($\overline{B}$) that would normally penetrate the top 38A and bottom 38B surfaces of the casing 28, and the right 40A and left 40B surfaces (FIG. 1) of the casing 28, among other things, as will be discussed later.

A "bucking" coil 42 is disposed at the front of the CRT 30, encompassing the CRT screen 34 and inside the aperture shield 36. A "convergence" coil 44 is disposed at the back of the CRT 30 around the neck 46 of the CRT 24. Together the bucking coil 42 and the convergence coil 44 form an active magnetic shield by generating an axial magnetic field ($\overline{B}_{AMF}$) aligned with the CRT-axis 48 in the Z-axis direction of the CMMS 20 to oppose an axial component of the external magnetic field ($\overline{B}_Z$), as will also be discussed later. The bucking coil 42 and the convergence coil 44 are electrically coupled and are wound in a similar direction such that the magnetic field generated by each of them reinforce each other in order to counter the axial component of the external magnetic field ($\overline{B}_Z$).

To measure $\overline{B}_X$, $\overline{B}_Y$ and $\overline{B}_Z$, the CMMS 20 employs an "X"-axis magnetic sensor 50, a "Y"-axis magnetic sensor 52 and a "Z"-axis magnetic sensor 54. These sensors are disposed at the back of the CRT 30, just outside of the μ-metal enclosure 32, as shown in FIG. 2. Both the "X"-magnetic sensor 50 and the "Z"-axis magnetic sensor 54 are located in the same plane, whereas the "Y"-axis magnetic sensor 52 is disposed just below the other two sensors. This arrangement provides the most coplanar arrangement of these sensors as possible. It should also be noted at this juncture that the bucking coil 42 and the convergence coil 44 are activated/deactivated based on the axial component of the external magnetic field ($\overline{B}_Z$), as sensed by the "Z"-axis magnetic sensor 54 only.

An upper quick-degaussing coil 56A and a lower quick-degaussing coil 56B surround the CRT 30 which provide the requisite degauss in the "X" "Y" and "Z" directions in response to a predetermined amount of change in the external magnetic field $\overline{B}$, as monitored by magnetic field sensors 50–54. The quick degaussing coils 56A and 56B apply alternating magnetic fields to the ferromagnetic components internal to the CRT 30. The alternating fields normally start out magnetically saturating the ferromagnetic components, and gradually decreasing the field strength to a low value or 0 Oersted. It should be noted that these degaussing coils 56A and 56B do not actively eliminate the $\overline{B}_Z$-component of the external magnetic field $\overline{B}$ as do the bucking coil 42 and the convergence coil 44; nor do these degaussing coils actively eliminate the $\overline{B}_X$-component and the $\overline{B}_Y$-component of the external magnetic field $\overline{B}$. Instead, these quick-degaussing coils 56A and 56B minimize the permanent magnetization tendencies in the ferromagnetic components introduced by the external magnetic field $\overline{B}$ and the axial magnetic field, $\overline{B}_{AMF}$. Although degaussing coils are well-known, the fastest degaussing coils can only degauss in ⅓₀ of a second. The CMMS degaussing coils 56A and 56B can degauss in ⅟₆₀ of a second or less. Once the magnetic sensors 50–54 detect a predetermined amount of change in the $\overline{B}_X$, $\overline{B}_Y$ or $\overline{B}_Z$ components, the sensors correspondingly activate the quick-degaussing coils 56A and 56B.

The passive magnetic shield greatly minimizes the effects of the $\overline{B}_X$-component and the $\overline{B}_Y$-component of the external magnetic field $\overline{B}$ directed at the top, bottom and sides of the CRT 30. In addition, the aperture shield 36 greatly minimizes the effects of the $\overline{B}_X$-component and $\overline{B}_Y$-component present at the edges of the monitor display without requiring any active magnetic shielding (e.g., neutralizing coils) and without requiring the μ-metal enclosure 32 to project too far outward, away from the CRT screen 34 which would interfere with user operation or may obstruct viewing of the CRT 30. The design of this aperture shield 36 is dependent upon the size of the aperture opening 58, the effective distance 60 that the CRT screen 34 is recessed from the aperture shield 36, and the surface area of the aperture shield 36 that is perpendicular to the CRT-axis 48. The surface area of the aperture shield 36 acts as a collector of magnetic lines of flux of the external magnetic field $\overline{B}$. The aperture shield 36 diminishes, for a given depth 60, the external magnetic field $\overline{B}$ flux lines. Thus, the further the CRT screen 34 is located with respect to the plane of the aperture shield 36, the weaker the external magnetic field $\overline{B}$. The $\overline{B}_X$-component and the $\overline{B}_Y$-component of the external magnetic field $\overline{B}$ tend to bend inward toward the screen 34. The aperture shield 36 in these two directions tends to diminish these components for a given depth 60. One important aspect of the CMMS 20 is that because the aperture shield 36 eliminates the need to actively shield (using electric coils) in the "X" and "Y" directions, the width 22 and height 24 of the CMSS 20 are reduced, thereby allowing the CMSS 20 to fit within the U.S. Navy EIA rack enclosure. On the other hand, most color monitor magnetic shields that are used currently are bulky and cannot fit within the EIA rack enclosures.

With respect to the active magnetic shield, the bucking coil 42 and the convergence coil 44 form a Helmholtz-style configuration. A typical Helmholtz coil actually comprises two coils of equal radius (r) electrically coupled such that both coils have equal ampere-turns and are physically separated by a distance equal to the radius (r). The Helmholtz coils are wound in a similar direction, such that the magnetic fields established by each coil, when energized, reinforce each other to create a linear axial magnetic field. The specified volume to be subjected to this field (e.g., CRT) is positioned between these two coils. With respect to the active shielding of the CMMS 20, the bucking coil 42 and the convergence coil 44 form the Helmholtz-style configuration. Although these two coils do not have equal radii (i.e., the bucking coil 42 being the larger of the two) and are not necessarily separated by a distance equal to the radius of either the bucking coil 42 or convergence coil 44, they do generate an axial magnetic field ($\overline{B}_{AMF}$), each reinforcing the other, that is used to oppose the $\overline{B}_Z$-component of the external magnetic field $\overline{B}$ to reduce any internal CRT axial magnetic field ($\overline{B}_{Z\text{-}CRT}$) which contributes to the color/geometry monitor display distortion, i.e., $\overline{B}_{AMF} - \overline{B}_Z = \overline{B}_{Z\text{-}CRT}$.

The purpose of the convergence coil 44 is that in the process of minimizing the $\overline{B}_Z$-component of the external magnetic field $\overline{B}$ at the front of the CRT 30, the back of the CRT (where the CRT color guns reside and emit the color beams) may not receive the same $\overline{B}_{AMF}$. This causes the horizontal red, green and blue lines to spread in the vertical direction. Therefore, the convergence coil 44 located at the back of the CRT 30 receives a sufficient amount of the current applied to the bucking coil 42 at the front of the CRT 30 to drive the three colored lines into a single line, thereby obtaining a single white line. The amount of current taken by the convergence coil 44 is dependent on the number of turns and the shape of the shield at that location.

Because the active magnetic shield requires only the bucking coil 42 and the convergence coil 44 (i.e., there is no need for coils adjacent the top surface 38A, bottom surface 38B, right side 40A or left side 40B), the casing 28, unlike the prior art, is sufficiently small in both width 22 and height 24 such that the CMMS 20 can be disposed and mounted inside a standard 19-inch EIA rack enclosure.

It should be noted at this juncture that the CMMS 20 not only eliminates color and geometrical distortion in the CRT screen display when subjected to ship degaussing fields of ±5 Oersteds, but continues to eliminate such distortion in external magnetic degaussing fields as high as ±8 Oersteds in varying degrees.

The electronic circuitry that controls the bucking coil 42, the convergence coil 44 and the quick degaussing coils 56A and 56B are shown in FIGS. 3-7, and will now be discussed.

Figure 3:
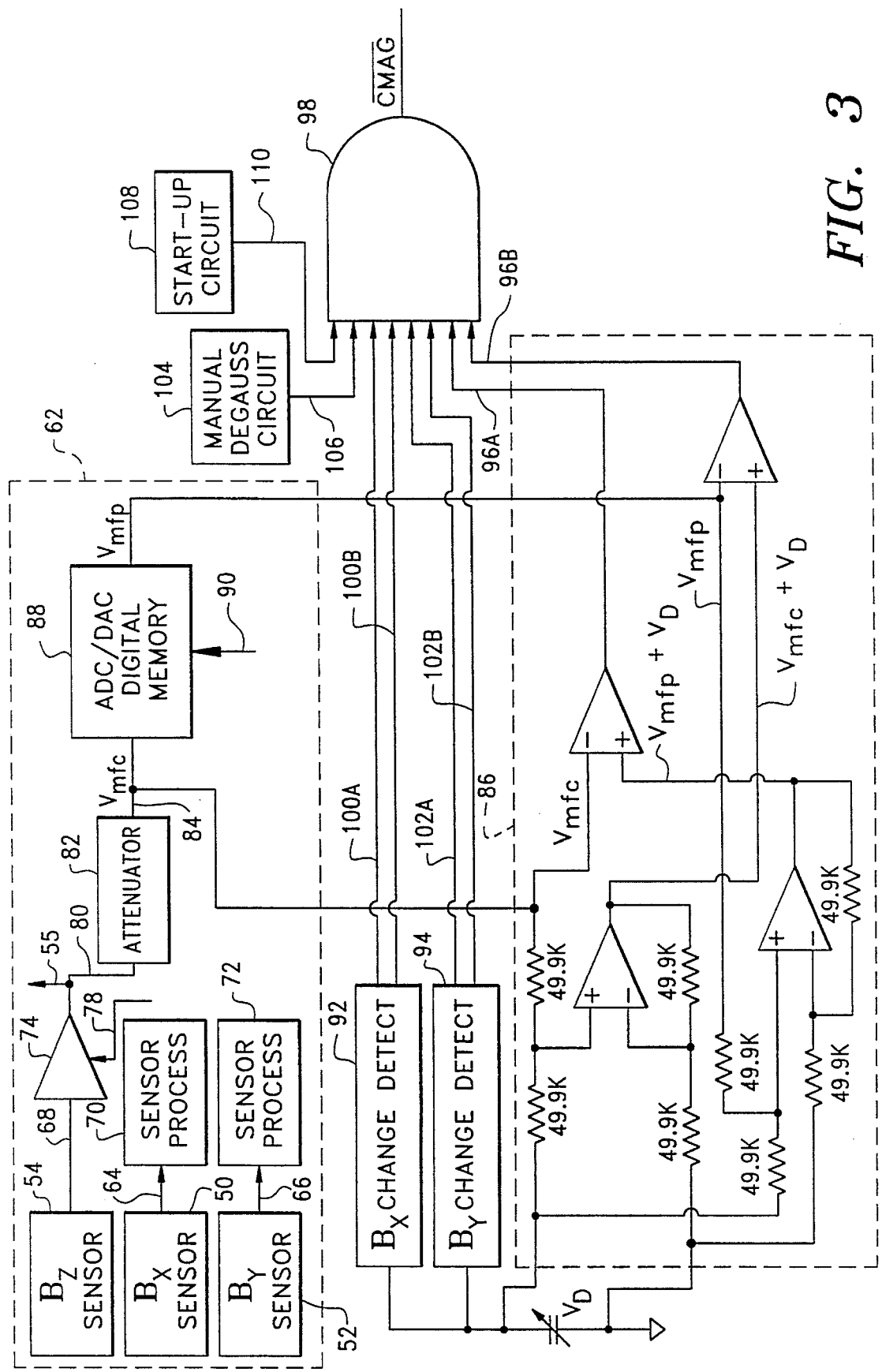
FIG. 3 is a block and schematic diagram of the magnetic sensor input portion of the circuitry of the present invention.

As shown in FIG. 3, a sensor input circuit 62 processes the signals from the magnetic sensors 50, 52 and 54 on input leads 64, 66 and 68, respectively. Since the processing for each magnetic sensor signal is similar, only one magnetic sensor signal (e.g., the Z-axis) processing will be discussed, it being understood that the other magnetic sensor signal processing paths 70 and 72 have similar components. It should also be noted that the bucking coil 42 and the convergence coil 44 are coupled to sensor input circuit 62 only through the Z-axis magnetic sensor 54 on input lead 55; the bucking coil 42 and convergence coil 44 receive no input from the X-axis magnetic sensor 50 nor from the Y-axis magnetic sensor 52.

The Z-axis magnetic sensor 54 input lead 64 feeds the magnetic sensor signal to a signal amplifier circuit 74 for boosting the sensor signal. The amplifier circuit 74 is also arranged to hold a particular sensor value whenever quick-degaussing is initiated. In particular, a quick degaussing control circuit 76 (FIG. 4, to be discussed later) issues a "hold" command to the amplifier circuit 74 on command lead 78. This prevents the bucking coil 42 and convergence coil 44 from trying to counter any magnetic field introduced by the degaussing coils 56A and 56B during quick degaussing. The amplified signal on lead 80 feeds a balanced attenuator circuit 82 for maintaining the amplified signal within an operating range to achieve a desired scaling, e.g., zero (0) Oersted$_{Z\text{-}axis}$=1.25 VDC. Assuming that there is no "hold" command being issued to the signal amplifier circuit 74, the signal on the attenuator output lead 84 is a voltage representation of the most current value of $\overline{B}_Z$, hereinafter known as $V_{mfc}$.

The $V_{mfc}$ signal is fed to a $\overline{B}_Z$-change detection circuit 86, as will be discussed later, and to an ADC (analog-to-digital converter)/DAC (digital-to-analog) digital memory 88 (e.g., Analog Devices AD7569 Complete, 8-bit Analog I/O System). The digital memory 88 converts the $V_{mfc}$ signal, into a digital signal, which it then stores, and overwrites any previously stored $V_{mfc}$ signal. Whenever the digital memory 88 receives an "update" command on command lead 90 from the quick-degaussing control circuit 76, the digital memory 88 re-converts the digital signal into an analog signal, which now represents the previous $\overline{B}_Z$, hereinafter known as $V_{mfp}$, since the $V_{mfc}$ signal is a continuous signal from the magnetic sensor 54.

The $V_{mfp}$ signal is sent to the $\overline{B}_Z$-change detection circuit 86 to be compared with $V_{mfc}$ to determine if $\overline{B}_Z$ has changed (e.g., approximately ±½ Oersted) since the last $\overline{B}_Z$ value was stored. In particular, the field change detection circuit 86 comprises voltage summers and comparators that determine whether $V_{mfc}$ has exceeded or fallen below $V_{mfp}$. To prevent initiating a quick-degauss command at the slightest change detected in any axis of the external magnetic field $\overline{B}$, a common DC threshold voltage, $V_D$, is added to the reference voltages in the field change detection circuit 86, as well as in the $\overline{B}_X$-change detection circuit 92 and the $\overline{B}_Y$-change detection circuit 94. This voltage, $V_D$ (e.g., +40 mV), when added to the reference voltages, establishes a voltage window which corresponds to external magnetic field changes of less than approximately ±½ Oersted. In addition, $V_D$ is user-controllable, thereby permitting the user to manually adjust the quick-degaussing sensitivity. If the voltage change falls outside this voltage window, a quick-degauss command is issued; if the voltage change remains inside this window, no quick-degauss command is issued. In particular, a voltage change outside this window in the Z-axis, causes the $\overline{B}_Z$-change detection circuit 86 to generate a low level (logic "0") voltage on comparator output leads 96A or 96B. On the other hand, a voltage change that remains inside this window in the Z-axis causes the $\overline{B}_Z$-change detection circuit. 86 to maintain a high level (logic "1") voltage on comparator output leads 96A or 96B, which feed into an AND gate 98. AND gate 98 receives inputs from the $\overline{B}_X$-change detection circuit 92 on input leads 100A and 100B, the $\overline{B}_y$-change detection circuit 94 on input leads 102A and 102B, a manual degauss circuit 104 lead 106, and a start-up circuit 108 lead 110 Should any one of these leads carry a logic "0", the output of AND gate 98 goes low. The output of AND gate 98 being low defines a "control magnetization" ($\overline{CMAG}$) command which initiates a quick-degauss command. The manual degauss circuit 104 permits the operator to initiate a quick-degauss while the start-up circuit 108 automatically initiates a quick-degauss whenever the CMMS 20 is powered-up.

The quick-degaussing control circuit 76 (FIG. 4) provides the timing and control necessary to accomplish a complete degauss in a desired amount of time (e.g., 15 msec) whenever the circuit 76 receives a $\overline{CMAG}$ command. Besides controlling a quick-degaussing circuit 112 (FIG. 5), the control circuit 76 must also issue the "update" command and the "hold" command at the appropriate times to the sensor input circuit 62. Finally, the control circuit 76 must blank the CRT screen 34 whenever a quick-degauss is being performed.

Figure 4:
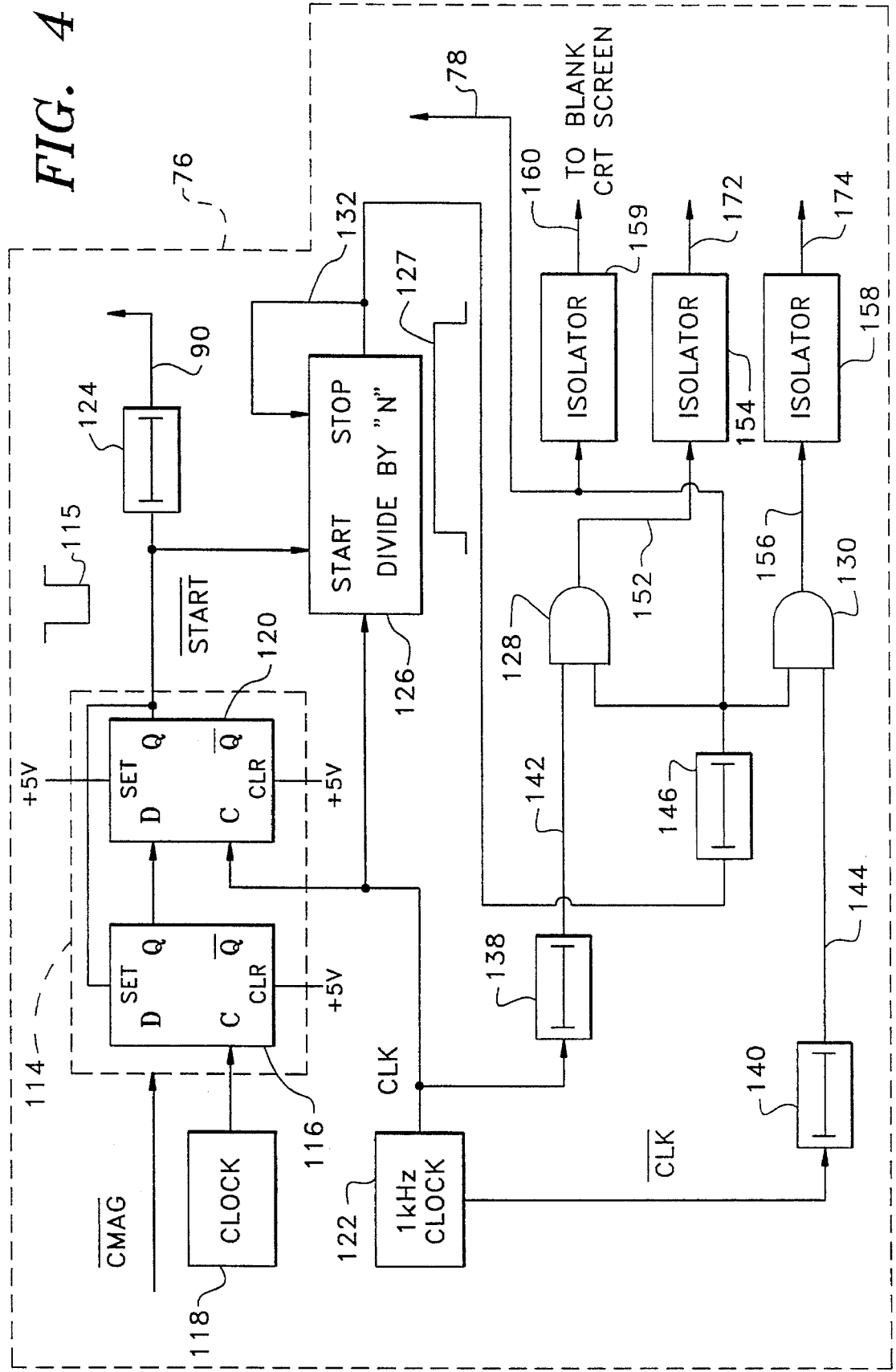
FIG. 4 is a block and schematic diagram of the quick-degaussing control circuit of the circuitry of the present invention.

To activate the quick degauss circuit 112, a pulse generator 114 creates a 1 msec pulse 115 ($\overline{START}$) when activated by the $\overline{CMAG}$ signal. As shown in FIG. 4, the $\overline{CMAG}$ signal is received by the pulse generator 114; in particular, the $\overline{CMAG}$ signal enters the data input (D) to a D-type flip flop 116 (e.g., 74HC74) whenever a clock 118 is active. The clock 118 is a low frequency clock (e.g., 5 Hz) that determines the maximum time between any quick degaussing. Whenever a low level logic $\overline{CMAG}$ signal is present at the D-input of the flip flop 116, a "0" is stored in the Q output of the flip flop 116. A second D-type flip flop 120 (e.g., 74HC74) receives the Q output from the first D-type flip flop 116 under the control of a 1 kHz clock 122 and creates a 1 msec low-level pulse 115 at its Q output by setting the first flop 116 to a "1" after receiving a low level logic $\overline{CMAG}$ command. This 1 msec pulse 115 is passed through a delay circuit 124. The output of this delay circuit 124 on lead 90 is the "update" command to the sensor input circuit 62. The delay circuit 124 ensures that the digital memory 88 does not update the various magnetic sensor values until after the quick degaussing is complete by inserting a delay (e.g., twice the length of the degauss enable pulse 127, to be discussed below).

The 1 msec pulse is also fed to a "divide-by-N" circuit 126 (hereinafter N circuit 126). Upon receiving the 1 msec pulse, the N circuit 126 (e.g., a 74HC161 chip) uses the 1 kHz clock 122 to generate a degauss enable pulse 127 which enables switch pair control gates 128 and 130, to be discussed later. The duration of the degauss enable pulse 127 establishes the length of the degaussing action. For example, if it is desired to have a degaussing action of approximately 15 msec (i.e., approximately 1/60 second), following receipt of the 1 msec pulse 115, the N circuit 126 outputs a degauss enable pulse 127 that is 15 clock pulses wide. At the 16th clock pulse, the N circuit 126 shuts off the degauss enable pulse 127 by resetting itself via reset lead 132.

Figure 5:
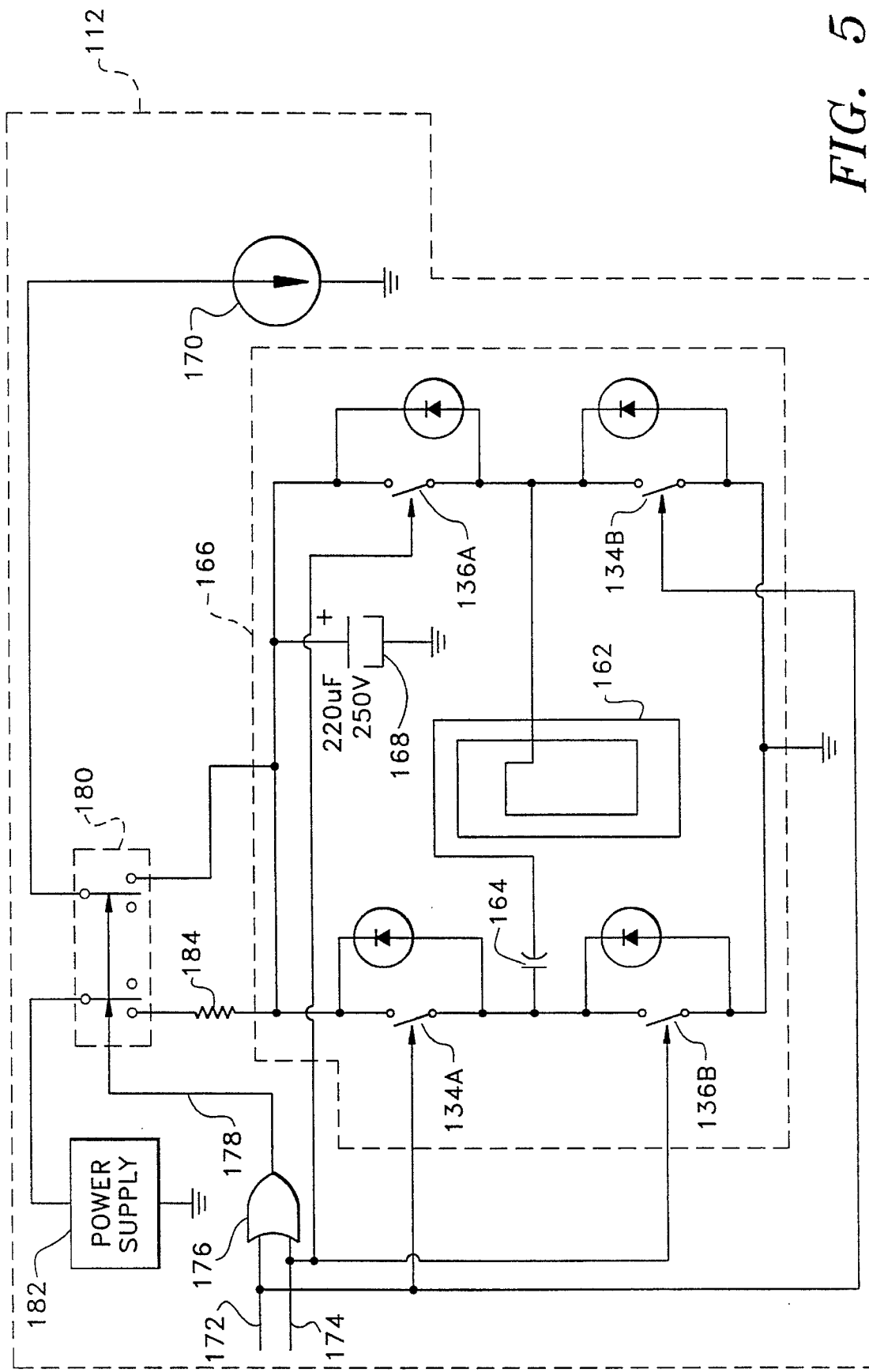
FIG. 5 is a block and schematic diagram of the quick-degaussing circuit.
Figure 6:
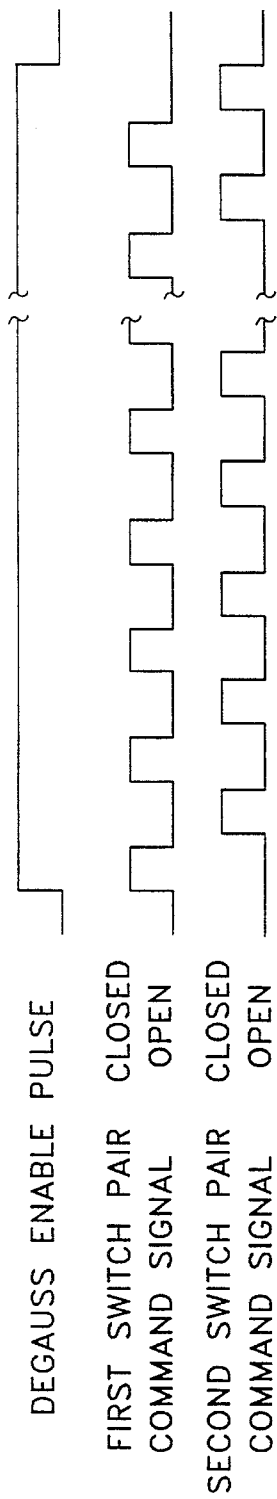
FIG. 6 is a timing diagram of the switch pair activation signals for a portion of the circuitry of the present invention.
Figure 7:
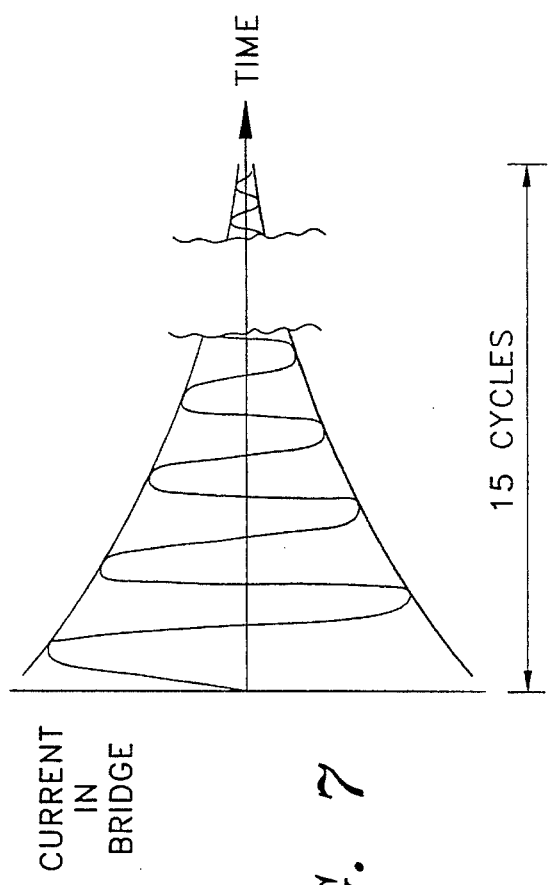
FIG. 7 is a graphical representation of the current characteristic generated in the degaussing coils during quick-degaussing by the present invention.

As will be discussed in further detail below, the quick-degaussing switch pairs (134A/134B and 136A/136B in FIG. 5) permit the quick switching of degaussing magnetic fields around the CRT 30 by altering the flow of current through degaussing coils 56A and 56B. In particular, the quick degaussing control circuit 76 uses the 1 kHz clock signal (CLK) and a 180°-out-of-phase signal ($\overline{CLK}$) to control the respective switch pairs. However, to operate correctly, the switch pairs must be controlled precisely so that one switch pair "breaks" before the other switch pair "makes". To accomplish this high precision "break before make", both the CLK signal and the $\overline{CLK}$ signal are fed through respective delay circuits 138 and 140 having the same duration of delay. The result is that there is approximately a 25 μsec separation between the first switch pair command signal on lead 142 and a second switch pair command signal on lead 144 (FIG. 6). The degauss enable pulse 127 is fed into its own delay circuit 146 to ensure that the initial switch pair command signal (on lead 142 or 144) is the shortest pulse in the group for proper initiation of the degaussing action.

As shown by the timing diagram of FIG. 6 and the circuit diagram in FIG. 4, the degauss enable pulse 127 enables the first switch pair control gate 128 and the second switch pair control gate 130. These gates 128 and 130 are then alternately gated by their respective command signals on gate leads 142 and 144. Whenever the first switch pair control gate 128 output goes high, a first switch pair activation signal on lead 152 is transmitted through an isolator circuit 154 (e.g., a transformer network) to the first switch pair 134A/134B in the quick degauss circuit 112 (FIG. 5). Similarly, whenever the second switch pair control gate 130 goes high, a second switch pair activation signal on lead 156 is transmitted through another isolation circuit 158 (e.g., a transformer network) to the second switch pair 136A/136B in the quick degauss circuit 112 (FIG. 5).

It should be further noted that the degauss enable pulse 127 also issues a blank screen command to the CRT 30 on lead 160 via an isolator circuit 159 (e.g., an opto-isolator HCPL2231 chip) to blank the CRT screen 34 throughout the quick degaussing action. Similarly, the degauss enable pulse 127 also issues the "hold" command to the sensor input circuit 62 on lead 78, discussed earlier.

The quick-degaussing circuit 112 is shown in FIG. 5. It should be noted at this juncture that degauss coils 56A and 56B (FIG. 2) are represented in FIG. 5 by a single coil 162 for simplicity; however, the operation of the quick degaussing circuit 112 is not changed based on the number degauss coils nor their arrangement (i.e., series or parallel). The quick-degaussing circuit 112 is based on forcing the degauss coil 162 to tune with a capacitor 164 at a given frequency for a number of cycles and at a controlled rate of decay. The degauss coil 162 and capacitor 164 can themselves be connected in series or parallel. The combination is connected to a bridge arrangement 166 of the first switch pair 134A/134B (e.g., N-channel field effect junction transistors, IRFP250) and the second switch pair 136A/136B (e.g., N-channel field effect junction transistors, IRFP250). The alternate activation of switch pairs 134A/134B and 136A/136B forces the frequency of oscillation within the desired duration of the degaussing action. The controlled decay is accomplished by having a storage capacitor 168 provide the current to this bridge 166 and to a controlled drain circuit 170. The controlled drain circuit 170 is adjusted so that there is very little or no energy left in the "storage capacitor" 168 by the time the last oscillating cycle is occurring. The initial peak currents in this arrangement are quite high and therefore desirable in this application.

In particular, the first switch pair isolator circuit 154 output on lead 172 and the second switch pair isolator circuit 158 output on lead 174 feed into an OR gate 176. When there is no switch pair activation signal on either lead 172 or 174, the output lead 178 of OR gate 176 is a low level logic signal. The presence of a low level logic signal on lead 178 maintains a switch 180 such that the power supply 182 (e.g., +150 VDC power supply) is charging the storage capacitor 168 via a charging resistor 184. On the other hand, whenever there is an activation signal (high logic level) on lead 172 or 174, this activation signal drives the switch 180 such that the bridge 166 is disconnected from the power supply 182 and the capacitor 168 discharges through the bridge 166 alternately via the switch pairs 134A/134B and 136A/136B and then to the controlled drain circuit 170.

As can be seen in FIG. 5, the activation signal on lead 172 drives the switch pair 134A/134B while the activation signal on lead 174 drives the switch pair 136A/136B. If the activation signal on lead 172 is high, the capacitor 168 discharges through switch 134A, through the tuning capacitor 164, through the degauss coil 162, through switch 134B, to the controlled drain circuit 170, and finally to ground. When the activation signal on lead 174 is high, the capacitor 168 discharges through switch 136A, through the degauss coil 162, through switch 136B, to the controlled drain circuit 170, and finally to ground. The result of this alternation of switch pairs generates a damped sinusoidal current having the character shown in FIG. 7 which creates diminishing and alternating degaussing magnetic fields.

Figure 8:
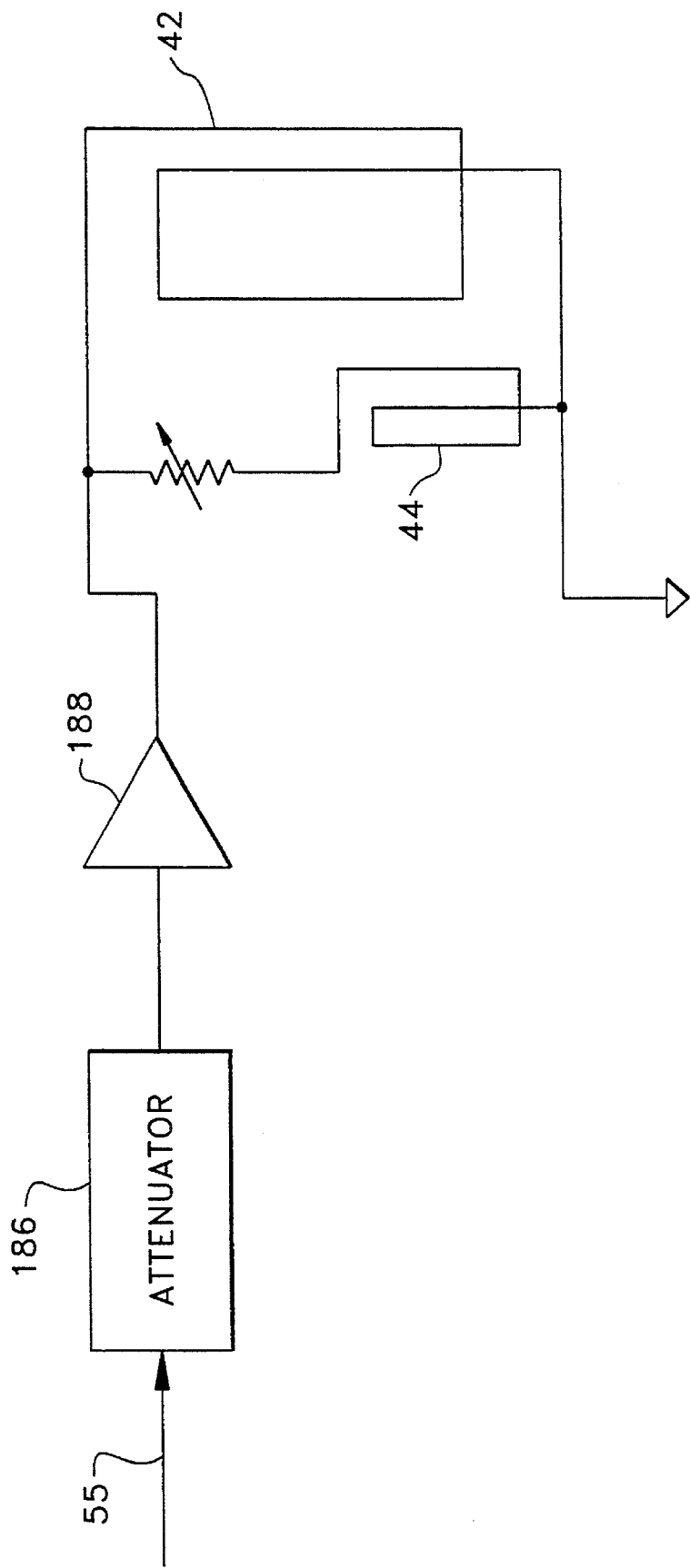
FIG. 8 is a block and schematic diagram of the bucking coil/convergence coil of the circuitry of the present invention.

As shown in FIG. 8, the bucking coil 42 and the convergence coil 44 are coupled to the Z-axis of the sensor input circuit 62 via input lead 55. In particular, the amplified signal on lead 80 (FIG. 3) is fed through lead 55 to a balanced attenuator circuit 186 and a power amplifier circuit 188. The power amplifier 188 provides the necessary power needed to generate the countering magnetic field $\overline{B}_{AMF}$, discussed earlier. The bucking coil 42 and the convergence coil 44 are electrically coupled (e.g., in parallel) with the power amplifier circuit 188. The bucking coil 42 and the convergence coil 44 are always active as long as there is a $\overline{B}_Z$ component of the external magnetic field $\overline{B}$ present. It should be noted that the bucking coil 42 and the convergence coil 44 could also be coupled in series to accomplish the same result.

Without further elaboration, the foregoing will so fully illustrate our invention that others may, by applying current or future knowledge, readily adopt the same for use under various conditions of service.

We claim:

1. An apparatus for reducing the visible distortion of a color cathode ray tube (CRT) of a color monitor caused by an external magnetic field, the CRT having a central longitudinal axis, a rear portion and a front viewing surface, the front viewing surface having a portion disposed generally perpendicular to the central longitudinal axis and peripheral edges, the external magnetic field including a component aligned with the central longitudinal axis in a first direction, said apparatus comprising:

(a) a bucking coil disposed adjacent the front viewing surface of the CRT and extending along at least a portion of the peripheral edges thereof for generating a first magnetic field also aligned with the central longitudinal axis but in a second direction opposite to said first direction in order to oppose the component of the external magnetic field that is aligned with said central longitudinal axis;

(b) a convergence coil disposed adjacent the rear portion of the CRT for generating a second magnetic field also aligned with the central longitudinal axis in said second direction, said convergence coil being electrically coupled to said bucking coil;

(c) sensor means located immediately adjacent the rear portion of the CRT and remote from said bucking coil and said convergence coil for directly sensing at a single location the external magnetic field aligned with the central longitudinal axis and for generating an output signal indicative thereof;

(d) control means providing electrical current to said bucking coil and said convergence coil based on said output signal; and (e) passive magnetic shield means covering a portion of the CRT while leaving a major portion of the front surface thereof exposed for unobstructed viewing by an operator of the monitor.

2. The apparatus of claim 1 wherein said passive magnetic shield means comprises an aperture shield and a housing, said housing encircling the CRT and the convergence coil, said aperture shield covering said bucking coil and the peripheral edges of the front viewing surface of the CRT and being disposed closely adjacent thereto to capture the external magnetic field present at the peripheral edges of the CRT without obstructing the view of the front surface thereof by the operator.

3. The apparatus of claim 2 additionally comprising means for quickly degaussing the CRT, said quick degaussing means comprising at least one degaussing coil surrounding a portion of the CRT for degaussing the CRT in no greater than approximately 1/60 of a second.

4. The apparatus of claim 3 wherein the CRT is disposed with respect to an X, Y, Z coordinate system having an X axis, a Y axis, and a Z axis, the central longitudinal axis of the CRT being axially aligned with the Z-axis, and wherein said quick degaussing means further comprises magnetic sensors for sensing the external magnetic field aligned along the X-axis, the Y-axis, and the Z-axis, and for providing respective signals indicative thereof.

5. The apparatus of claim 4 wherein said quick degaussing means further comprises controller means for controlling said quick degaussing means, said controller means activating said quick degaussing means whenever at least one of said respective signals meets a criterion corresponding to a predetermined amount of change in the external magnetic field aligned along the X-axis, the Y-axis, and the Z-axis.

6. The apparatus of claim 5 wherein said criterion constitutes at least one of said respective signals exceeding a predetermined maximum threshold or falling below a predetermined minimum threshold.

7. The apparatus of claim 5 wherein said criterion can be adjusted by the operator.

8. The apparatus of claim 5 wherein said controller means further comprises manual degauss means, said manual degauss means permitting the operator to manually initiate a quick-degaussing.

9. The apparatus of claim 5 wherein said controller means further comprises start-up degauss means, said start-up degauss means automatically initiating a quick-degaussing upon powering-up said apparatus.

10. The apparatus of claim 5 wherein said controller means further comprises holding means, said holding means holding the values of said signals indicative of the external magnetic field aligned along the X-axis, the Y-axis and the Z-axis during quick-degaussing.

11. The apparatus of claim 5 wherein said controller means further comprises blanking means, said blanking means blanking the front viewing surface during quick-degaussing.

12. The apparatus of claim 5 wherein said criterion is checked after every quick-degaussing.

13. The apparatus of claim 5 wherein the duration of the quick-degaussing can be N pulses wide.

14. The apparatus of claim 3 wherein said quick-degaussing means forces said at least one degaussing coil to tune with a capacitor at a given frequency for a number of cycles and at a controlled rate of decay.

15. The apparatus of claim 14 wherein quick-degaussing means further comprises a first switch pair and a second switch pair that operate in alternation with respect to each other to force said at least one degaussing coil to tune with said capacitor, said first switch pair breaking contact before said second pair makes contact and said second pair breaking contact before said first pair makes contact.

16. The apparatus of claim 2 wherein said apparatus is arranged to fit within a 19-inch (48.3 cm) wide support rack.

17. The apparatus of claim 1 wherein said convergence coil is coupled in parallel with said bucking coil.

18. The apparatus of claim 1 wherein said convergence coil receives a portion of the electrical current supplied to said bucking coil.

19. The apparatus of claim 1 wherein said apparatus is capable of reducing color distortion of the cathode ray tube caused by external magnetic fields up to approximately ±5 Oersteds.

20. The apparatus of claim 1 additionally comprising means for quickly degaussing the CRT, said quick degaussing means comprising at least one degaussing coil surrounding a portion of the CRT for degaussing the CRT in no greater than approximately 1/60 of a second.

21. The apparatus of claim 20 wherein the CRT is disposed with respect to an X, Y, Z coordinate system having an X axis, a Y axis, and a Z axis, the central longitudinal axis of the CRT being axially aligned with the Z-axis, and wherein said quick degaussing means further comprises magnetic sensors for sensing the external magnetic field aligned along the X-axis, the Y-axis, and the Z-axis, and for providing respective signals indicative thereof.

22. The apparatus of claim 21 wherein said quick degaussing means further comprises controller means for controlling said quick degaussing means, said controller means activating said quick degaussing means whenever at least one of said respective signals meets a criterion corresponding to a predetermined amount of change in the external magnetic field aligned along the X-axis, the Y-axis, and the Z-axis.

23. The apparatus of claim 22 wherein said criterion constitutes at least one of said respective signals exceeding a predetermined maximum threshold or falling below a predetermined minimum threshold.

24. The apparatus of claim 22 wherein said criterion can be adjusted by the operator.

25. The apparatus of claim 22 wherein said controller means further comprises manual degauss means, said manual degauss means permitting the operator to manually initiate a quick-degaussing.

26. The apparatus of claim 22 wherein said controller means further comprises start-up degauss means, said start-up degauss means automatically initiating a quick-degaussing upon powering-up said apparatus.

27. The apparatus of claim 22 wherein said controller means further comprises holding means, said holding means holding the values of said signals indicative of the external magnetic field aligned along the X-axis, the Y-axis and the Z-axis during quick-degaussing.

28. The apparatus of claim 22 wherein said controller means further comprises blanking means, said blanking means blanking the front viewing surface during quick-degaussing.

29. The apparatus of claim 22 wherein said criterion is checked after every quick-degaussing.

30. The apparatus of claim 22 wherein the duration of the quick-degaussing be N pulses wide.

31. The apparatus of claim 20 wherein said quick-degaussing means forces said at least one degaussing coil to tune with a capacitor at a given frequency for a number of cycles and at a controlled rate of decay.

32. The apparatus of claim 31 wherein quick-degaussing means further comprises a first switch pair and a second switch pair that operate in alternation with respect to each other to force said at least one degaussing coil to tune with said capacitor, said first switch pair breaking contact before said second pair makes contact and said second pair breaking contact before said first pair makes contact.

33. The apparatus of claim 1 wherein said apparatus is arranged to fit within a 19-inch (48.3 cm) wide support rack.

* * * * *